United States Patent [19]

Pepera et al.

[11] Patent Number: 5,027,317

[45] Date of Patent: Jun. 25, 1991

[54] METHOD AND CIRCUIT FOR LIMITING ACCESS TO A RAM PROGRAM MEMORY

[75] Inventors: Gerald S. Pepera, Mentor; Richard S. Gunsaulus, Solon, both of Ohio

[73] Assignee: Allen-Bradley Company, Inc., Milwaukee, Wis.

[21] Appl. No.: 325,454

[22] Filed: Mar. 17, 1989

[51] Int. Cl.[5] .............................................. G06F 12/16
[52] U.S. Cl. ................................ 364/900; 364/969.2; 364/952.5; 364/969.4
[58] Field of Search ..................... 364/200, 900, 246.8, 364/969.2

[56] References Cited

U.S. PATENT DOCUMENTS

| | | | |
|---|---|---|---|
| 3,725,872 | 4/1973 | Balogh, Jr. et al. | 364/200 |
| 4,434,464 | 2/1984 | Suzuki et al. | 364/200 |
| 4,439,830 | 3/1984 | Chueh | 364/200 |

*Primary Examiner*—Gareth D. Shaw
*Assistant Examiner*—Kakali Chaki
*Attorney, Agent, or Firm*—Quarles & Brady

[57] ABSTRACT

A method and a circuit limit access to a locked portion of memory to periods when application program instructions in the locked portion of memory are being executed. An UNLOCK routine of processor instructions is executed before accessing the portion of the memory storing the application program instructions and a LOCK routine of processor instructions is executed to re-secure the memory after such access. The locking and unlocking is accomplished by addressing a comparator and transmitting data representing either a lock value or an unlock value. The comparator is connected to enable and disable decoding circuitry which in turn controls access to the locked portion of memory.

10 Claims, 2 Drawing Sheets

METHOD AND CIRCUIT FOR LIMITING ACCESS TO A RAM PROGRAM MEMORY

BACKGROUND OF THE INVENTION

1. Technical Field

The field of the invention is electronic controllers for controlling industrial machines and processes, and more particularly processor-based circuit board modules used in such equipment and controllers.

2. Description of the Background Technology and Related Art

Industrial controllers are typically connected to assembly line equipment and process control equipment in manufacturing facilities and other industrial plants. Smaller controllers, including programmable controllers, have typically been built as a set of modules that are inserted in a rack somewhat like a set of books placed side-by-side in a bookcase. These modules may include a main processor (CPU) module, communication modules and I/O interface modules.

The main processor module (CPU) typically includes a microprocessor or microcomputer and a programmable read-only memory (PROM) for storing operating system instructions to be read and executed by the microprocessor. The module also had a random access memory (RAM) for storing data and application programs. Over the years the other modules have become peripheral processor modules with their own processor, PROM and RAM. These modules have been programmed to perform many specialized control functions under the general supervision of the main processor (CPU) module.

Where many different application programs are to be stored and executed, it is desirable to store and execute them in random access memory (RAM). This allows convenience in loading, testing and debugging such programs.

The invention herein relates to a specialized I/O module with a detachable RAM cartridge. Application programs can be developed in a higher-level language with off-line development systems and entered in the cartridge. When the program has been developed, the cartridge may then be carried to a certain location in a factory and installed in the processor-based module in a programmable controller system.

In such an arrangement, there is a need to prevent the processor from writing data to locations in the RAM, except when the processor is actually executing the application program. This helps assure the integrity of the program, which may then be readily reproduced where it is desired to use it in another machine or provide a duplicate cartridge. Thus, when background operations are being executed, the RAM program memory is inaccessible or "locked out" against access by its associated processor.

SUMMARY OF THE INVENTION

The invention is incorporated in a method and a circuit for preventing access and allowing access to a locked portion of memory. The invention can be applied wherever it is desired to limit the ability of a processor to access a random access memory or to access an application program memory.

The method includes executing an UNLOCK routine of processor instructions before accessing a portion of the memory which is addressable within a selected range of addresses. Executing the UNLOCK routine includes the steps of (a) generating a selected address to enable a comparator and (b) generating predetermined data to the comparator to enable decoding circuitry.

The processor subsequently generates addresses within the selected range of addresses to the decoding circuitry to generate a circuit control signal to the memory, the circuit control signal enabling the memory for access in response to such addresses. This allows access to a protected portion of the memory that was not accessible prior to executing the UNLOCK routine.

The method further includes executing a LOCK routine of processor instructions after accessing the protected portion of the memory, including the steps of (c) generating the selected address to enable the comparator a second time, and (d) generating data to the comparator other than the predetermined data to disable the decoding circuitry. This prevents further access to memory within the selected range of addresses without re-executing the UNLOCK routine of processor instructions.

A circuit for practicing the method of the invention includes a processor for executing an UNLOCK routine of processor instructions and for executing a LOCK routine of processor instructions which are stored in an associated PROM as part of the operating system firmware. The portion of the memory which is locked is enabled by a memory control signal from decoding circuitry, but only when the decoding circuitry receives a memory addressing enable signal which is controlled by a comparator.

When the processor executes the UNLOCK routine, it addresses the comparator through the decoding circuitry at a selected address "38000" (hexadecimal). The processor also generates a byte of predetermined data "55" (hexadecimal) to the comparator, which then generates the memory addressing enable signal back to the decoding circuitry. The decoding circuitry then enables the portion of a memory which stores application program instructions with a memory circuit control signal so that this portion of memory can be accessed.

After executing the application program instruction, the processor executes the LOCK routine of processor instructions, to again address the comparator at the predetermined address "38000". This time, however, the processor generates data other than "55" (hex). The comparator responds to this other data to remove the memory address enabling signal which disables the memory circuit enabling signal to the memory and prevents further access to until the next cycle of execution of the UNLOCK routine of processor instructions.

One object of the invention is to protect a portion of memory from unintended overwriting of its contents. The invention is more specifically applied to preventing data from being written to an application program memory except for periods when application program instructions in the memory are being executed.

Another object of the invention is to limit access to the the protected portion of memory by executing a very short routine of instructions that will not slow overall execution of the operating system firmware or application programs.

Another object of the invention is to provide an access protection method and circuit for a portion of a memory storing user application programs.

Another object is to provide an access protection method and circuit for a detachable RAM cartridge.

These and other objects and advantages of the invention will be apparent from the following description, in which reference is made to the accompanying drawings, which form a part hereof, and in which there is shown by way of example a preferred embodiment of the invention. This example does not necessarily represent the full scope of the invention, however, and reference is therefore made to the claims for determining the various embodiments within the scope of the invention.

DETAILED DESCRIPTION OF THE PREFERRED EMBODIMENT

Figure 1:
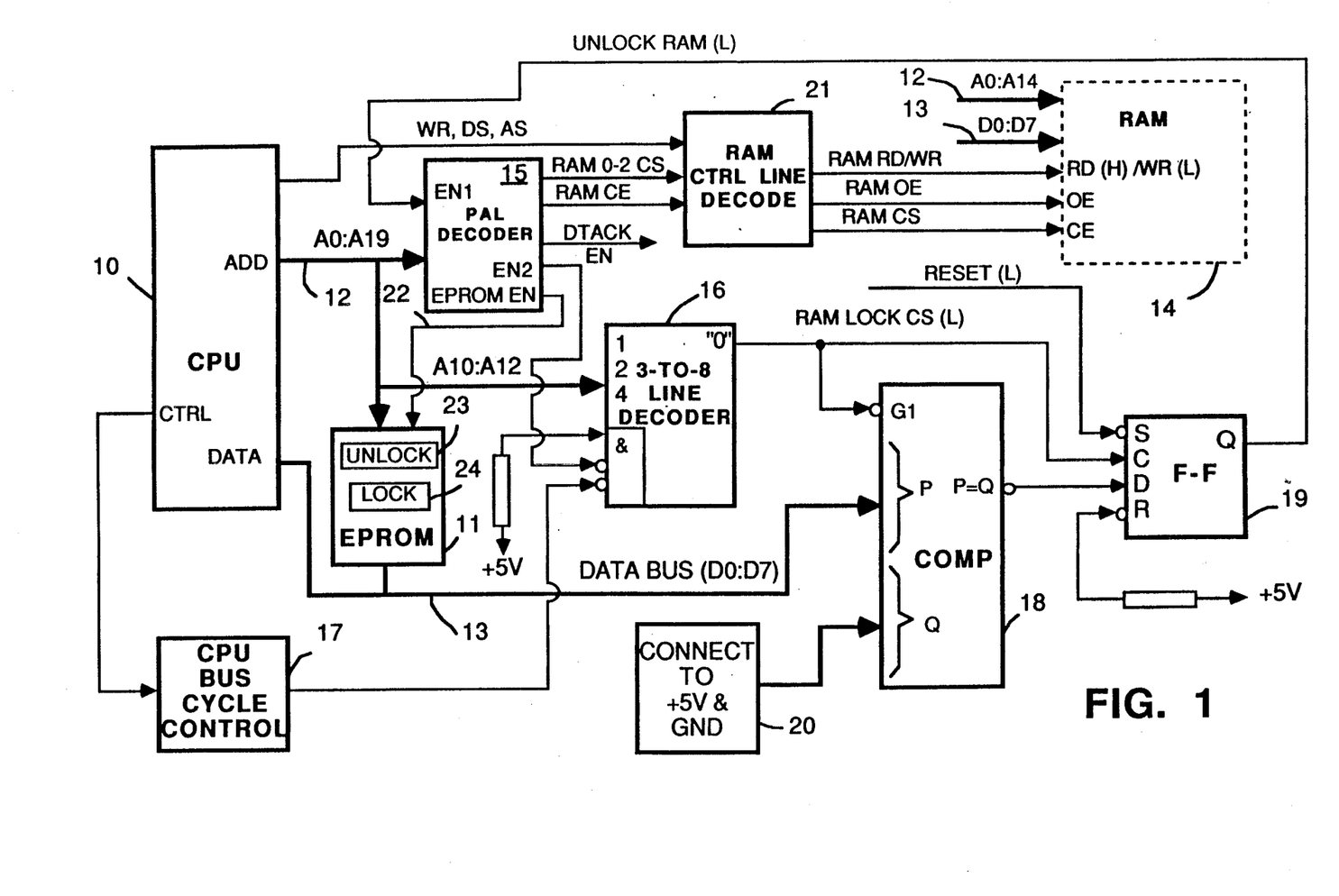
FIG. 1 is a block diagram of a microprocessor-controlled circuit for practicing the method of invention.

FIG. 1 illustrates a microelectronic processor circuit in a single-axis motion control I/O module for a programmable controller. In the preferred embodiment the CPU is a MC68008 microprocessor available from Motorola Semiconductor Products, Inc. This processor operates internally as a 32-bit processor, but communicates to other circuitry through an 8-bit data bus. Its architecture, instruction set, operation and use with peripheral circuits is described in literature available from Motorola as well as many popular computer science and engineering books.

The CPU 10 is driven by timing signals running at a frequency of 10 Mhz. from a clock circuit (not shown).

The CPU 10 is connected via lines A0:A19 of an address bus 12 and lines D0:D7 of an eight-bit wide data bus 13 to communicate with other circuitry in the module including an erasable programmable read-only memory (EPROM) 11. This circuit is preferably a 27C101G 128k×8-bit EPROM available from Hitachi or Fujitsu. This EPROM 11 stores the operating system firmware instructions for the CPU 10, including startup routines and many service routines for handling typical microcomputer operations. The EPROM 11 is addressed at locations 00000-1FFFF (hex) in the memory addressing range of the CPU 10.

The CPU 10 also connects through lines A0:A14 of the address bus 12 and through lines D0:D7 of the data bus 13 to a random access memory (RAM) 14 which is located in a detachable cartridge as represented by the phantom lines. In the preferred embodiment this memory has 96k bytes of capacity with 72k bytes available for user application programs written in a higher-level motion control language. The RAM memory 14 comprises three 32k×8-bit static random access memories available from Hitachi.

The RAM 14 is addressable in two portions at two addressing ranges. The first portion is always accessible (unlimited access) and is addressable at locations 20000 to 25FFF (hexadecimal). This 24k-byte portion is used for general purpose storage of data which the CPU 10 utilizes in executing any instructions including its operating system program or application programs. A second portion is locked against access (limited access) except as described below. This 72k-byte portion is addressed at locations 46000-57FFF (hexadecimal) in the CPU addressing range. In this example, this portion of the RAM 14 is the user application program memory, which stores application program instructions.

The first 32k memory circuit includes 24k addresses within the range of addresses mentioned above for unlimited access and 8k addresses within the range for limited access. The second and third 32k memory circuits have all addresses within the range for limited access.

To read and write information to and from the RAM 14, read, write, output enable and chip select (RAM RD/WR, RAM OE and RAM CS) signals must be transmitted to certain inputs on the memory circuits. A RAM RD/WR memory control signal is transmitted on a RAM RD/WR line from a RAM control line decoding circuit 21 to a RD/WR input on the RAM memory circuits. The set of lines for one memory circuit has been shown with it being understood that there is a similar set for the second and third RAM memory circuits. During a read cycle, the signal at the RD input on the selected portion of RAM 14 is at a logic high level. During a write cycle this signal is at a logic low. A RAM OE signal is transmitted during read cycles to a data output enable input on the memory circuits. A RAM CS (chip select signal) is transmitted to a chip enable (CE) input on the memory circuits for both read and write cycles.

The CPU 10 is also connected through the higher order lines A12:A19 of its address bus 12 to a PAL address decoder 15. This circuit is preferably a 20L8-A2 programmable array logic circuit available from Monolithic Memories. The addresses at which the CPU 10 communicates with other circuits can be programmed into the PAL address decoder 15 according to a desired set of enable signals to be transmitted to other circuitry in response to CPU addresses or a range of CPU addresses assigned to that circuitry. Programming methods for this type of circuit 15 are available from the manufacturer of the circuit and are within the ordinary skill in the art.

In the present circuit, the EPROM 11 is enabled through a EPROM EN (EPROM enable) output on the PAL decoder 15 and EPROM EN enable line 22 when the CPU generates an address within the range of CPU addresses assigned to the EPROM 11. The RAM 14 is enabled when the CPU generates an address within the two ranges of CPU addresses assigned to the RAM as discussed above. And the other circuits are enabled when the CPU 10 generates addresses within a fourth range of addresses.

In this fourth range of addresses the PAL address decoder 15 is assisted in addressing circuits at individual addresses through several 3-to-8-line decoders 16, the one of interest being illustrated in FIG. 1. Lines A10:A12 of the address bus connect to binary-coded data inputs "1", "2" and "4" on the decoder 16.

When the decoder 16 is enabled at three enable inputs and when binary number "000" is transmitted on address lines A10:A12 to the decoder 16, a low-true output signal is transmitted from the "0" output of the decoder 16 to an enable input (G1) on a comparator 18 and also to a clock (C) input on a D-type flip-flop (F-F) 19. This signal and the line transmitting it have been designated the RAM LOCK CS signal and RAM LOCK CS line, respectively.

The decoder 16 has three enable inputs (&). A first high-true input is pulled up to a +5-volt logic high signal and is always enabled. A second, low-true enable input is connected to receive an enable signal from the EN2 output on the PAL decoder 15.

A third enable input, also low-true, receives an enable signal for every bus cycle initiated by the CPU 10. The CPU 10 has several control lines, specified in the literature on the MC68008, which carry control signals during each bus cycle (read cycle or write cycle). These control signals are coupled through CPU bus cycle control circuit 17 to enable the other input on the decoder 16 each time address or data is transmitted on the address and data buses 12 and 13.

The comparator 18 has a set of "P" data inputs connected to lines D0:D7 of the data bus 13 to receive a byte of data. The comparator 18 has a set of "Q" data inputs connected as shown by block 20 to a +5-volt supply voltage and to ground to receive a byte of logic high and low signals in the pattern "0101 0101". This binary value translates to the hexadecimal value "55". When the data at the "P" inputs is also "55", and providing the comparator is enabled at input G1, a match is detected and a logic low signal is transmitted from the output (P=Q) to a D input on the flip-flop 19. The comparator 18 is preferably an HCT688 available from RCA or Signetics. The flip-flop 19 is preferably an HCT74 available from RCA or Signetics.

The flip-flop 19 has a low-true set (S) terminal connected to receive a low-true RESET signal on power-up from a power-up/reset circuit associated with the RAM memory 14 in the detachable cartridge. This sets the "Q" output on the flip-flop 19 to a logic high. After power-up, the RESET signal goes high and the reset (R) input is pulled up to a +5-volt logic high signal, which allows the outputs of the flip-flop 19 to be controlled by the signals at the "C" and "D" inputs. When a logic low signal is received at the "D" input from the P=Q output on the comparator 18, and when a low-to-high transition signal (the trailing edge of a logic low pulse) is received at the "C" input through the RAM LOCK CS line, the flip-flop 19 is switched to provide a logic low signal at its "Q" output. This signal is sent back to the PAL decoder 15 to enable a memory addressing enable input (EN1). This input controls the ability to write data to the limited access portion of the RAM.

If data other than "55" is sent to the comparator, when it is enabled at input G1, the Q output of the flip-flop 19 will go high and the PAL decoder 15 will be disabled at input EN1. This disables the ability to write data to the limited access portion of the RAM memory 14.

The enabling of the EN1 input on the PAL decoder 15 controls the enabling of the RAM 0-2 CS lines in response to addresses in the limited access range of memory addresses. Signals on the RAM 0-2 CS lines are logically combined with the memory write (WR), address strobe (AS) and data strobe (DS) signals from the CPU 10 to generate the RAM RD/WR signals and the RAM OE (output enable) signals to the memory circuits in the RAM 14.

When the EN1 input is not enabled, lines RAM 0-2 CS are not enabled for writing to addresses in the limited access range. In this state, the RAM 1 CS signals and RAM 2 CS signals cannot be enabled for the purpose of writing data or information to the RAM 14. This prevents write signals from being transmitted on the RAM RD/WR lines to two of the memory circuits in the RAM 14, and consequently no data or information of any type can be written to this portion of the RAM 14. Active signals may be transmitted on the RAM 0 CS line to circuit 21 depending upon whether an address from the CPU 10 is in the unlimited access range or the limited access range. This is because one of the memory circuits is subdivided into an unlimited access portion and a limited access portion.

The RAM CE signal is transmitted from the PAL decoder 15 to the RAM control line decoding circuit 21 in response to . addresses in both the limited access range and in the unlimited access range. The RAM CE signal and the address strobe (AS) signal are combined to generate RAM CS (chip select) signals to chip enable (CE) inputs on the memory circuits in the RAM 14, and these signals are not conditioned upon the state of the EN1 input on the PAL decoder circuit 15.

When the "Q" output on the flip-flop 19 goes low in response to data "55" at the comparator 18, the enable input EN1 on the PAL decoder 15 is enabled. This allows write signals to be generated to the limited access portion of the RAM 14 in response to signals on the RAM 0-2 CS lines, which in turn are responsive to addresses in the limited access addressing range during CPU write cycles. The PAL decoder 15 includes logic circuitry that would allow data to be read from the limited access portion of RAM 14 with the disable signal present at input EN1, provided the CPU 10 were programmed to read data from these locations. Thus, the RAM 0-2 CS lines are active during CPU read cycles, but not during CPU write cycles. A disable signal at the EN1 input only limits the generating of a write signal on the RAM RD/WR line to two of the memory circuits and to a portion of the third memory circuit.

To enable the comparator 18 to receive the data "55", or other data, at its "P" inputs, the CPU 10 generates the address "38000" (hexadecimal) on the address bus. This number translates to the binary pattern "0011 1000 0000 0000 0000". Thus, logic "1's" are transmitted on address lines A15, A16 and A17, and logic "0's" are transmitted on the address lines A0:A14 and A18:A19. This logical input to the PAL decoder 15 generates a signal from the EN2 output to enable decoder 16. At the same time, decoder 16 is receiving "000" on lines A10:A12 to enable the comparator 18 through the RAM LOCK CS line. The comparator 18 is thus addressed and enabled at CPU address "38000" (hex). The data that is transmitted on data bus 13 to address "38000" will be compared with the number "55" (hexadecimal) to lock or unlock access to the RAM through the PAL decoder 15.

The locking and unlocking of access to the limited access portion of the RAM 14 is under the control of the CPU 10, which executes these functions in response to a UNLOCK subroutine of processor instructions 23 stored in the EPROM 11 and in response to a LOCK subroutine of processor instructions 24 stored in the EPROM 11.

The UNLOCK subroutine is called and executed before accessing the RAM to execute each user application program instruction stored in the RAM 14. The application program instructions are written in a higher-level language, compiled and then stored in the RAM 14. The LOCK subroutine is called and executed after accessing the RAM to execute each user application program instruction.

Calls to the UNLOCK and LOCK subroutines are placed in a number of higher-level task routines executed by the CPU 10. These higher-level task routines include tasks for executing user application instructions and tasks for communicating with peripheral devices.

The following is an example of such a routine, which is executed in conjunction with a handheld programming device to execute user program statements either one-at-a-time (single step) or in short sequences. The "breakpoint" is a point in the user application program, where execution is stopped, for purposes of monitoring and debugging the user application program.

TABLE 1

AT_BREAKPOINT TASK EXECUTION ROUTINE
(C programming language)

Comment: This routine calls the procedures to execute a user programming statement depending on the type of stmt_signals. If the signal is irrelevant it is ignored. At the end, it sets any new state for statement execution tasks.

```
#include      <stdio.h>
#include      "sysdefs.h"
#include      "system_variables.h"
#include      "signals.h"
#include      "stmt.h"
extern int    get_event();
extern void   execute_app_prog_statement();
extern void   unlock_ram();
extern void   lock_ram();
int           at_breakpoint_trans()
{    int_stmt_signals;
     stmt_signals = get event (RES_STMT_EXEC);
     wait_list.run = FALSE;
     $pgm_status = running;
     unlock_ram();
     execute_app_prog_statement();
     lock_ram();
     return (T5_PROCESS);
        break;
     case CONT_STMT_EXEC:
        if (step_brk_cnt++ == step_brk_lmt)
        {   step_brk_cnt = 0;
            release();
        }
        wait_list.run = FALSE;
        $pgm_status = running;
        unlock_ram();
        execute_app_prog_statement();
        lock_ram();
        stmt_state = T5_PROCESS
        break;
     default: break;
     }
     return (stmt_state);
}
```

In the above routine, there are two occurrences of the following sequence:

```
unlock_ram();
execute_app_prog_statement();
```

```
lock_ram();
```

The first statement calls the UNLOCK subroutine, the second instruction executes the next user application programming statement and the third instruction executes the LOCK subroutine. The UNLOCK subroutine is listed in Table 2 below.

TABLE 2

UNLOCK SUBROUTINE
(68000 assembly language)

| Label/Instruction | Comment |
|---|---|
| c.unlock_ram | |
| movea.1 curtcb,a0 | ; point to task control byte for current task |
| moveq #ID_ERR,d0 | ; set error return status |
| cmp.b #UNLOCKVAL,RAMSTAT(a0) | ; verify if already unlocked |
| beq.s was_unlocked | ; branch on unlock value to was_unlocked |
| moveq #OK,d0 | ; setup OK return status |
| move.b #UNLOCKVAL,RAMSTAT(a0) | ; mark ram as enabled |
| was_unlocked | |
| move.b #UNLOCKVAL,RAMLOCK | ; signal hardware to unlock ram |
| rts | ; return from subroutine |

When the UNLOCK subroutine is called a first instruction, seen in Table 2 above, is executed as seen above to set up an address in register "a0" that will point to a byte of RAM status data in a task control block for the task or sequence being executed by the CPU 10. Each task has its own task control block data structure and the RAM status data for each task is stored in relatively the same position (pointed to by register a0) within this block. The locked/unlocked status of the RAM 14 is signified by the RAM status data stored in the task control block.

Next, the CPU 10 executes a second instruction to set up an "ERROR" return status, should the CPU 10 have to exit the subroutine prematurely and before the RAM is unlocked for access. Register "d0" in the CPU 10 is assigned to hold data which is checked on return from the subroutine. The data is referred to as "#ID.ERR" which is some predetermined constant.

The CPU 10 then executes a third instruction to compare the RAM status data in the task control block pointed to by register a0 with a predetermined constant for #UNLOCKVAL, which has been determined to be "55" (hexadecimal). If the unlock value is present, the CPU 10 branches to a "was.unlocked" sequence. Corrective action is required because the memory is not supposed to be unlocked and accessible at this point in the subroutine. If the RAM status is "unlocked" at this point in the subroutine, the single instruction in the was unlocked sequence is executed to transmit the constant "#UNLOCKVAL" ("55") to the RAMLOCK address (38000 hex). This unlocks the RAM 14 so that the RAM status will be correct.

Assuming the check of RAM status shows it not to be unlocked (any other data than "55"), the error status is changed to OK in the fifth instruction. In the sixth instruction, the unlock value "55" is loaded in the RAM status data in the task control word. The CPU 10 then proceeds to the instruction under the was unlocked label to transmit the constant "#UNLOCKVAL" ("55") to the RAMLOCK address (38000 hex). The CPU 10 then executes a return instruction to return to the AT.BREAKPOINT task.

Referring back to Table 1, after the UNLOCK subroutine is executed, the CPU 10 has access to the user application instructions and data in the RAM and executes the next user application instruction ("execute.app.prog.statement()"). This is followed by execution of the LOCK subroutine to disable access to the RAM 14 until the next unlock-execute-lock sequence.

The LOCK subroutine is listed in Table 3 below.

TABLE 3

LOCK SUBROUTINE
(68000 assembly lanuage)

| Label/Instruction | Comment |
|---|---|
| c.lock_ram | |
| movea.l curtcb,a0 | ; point to task control byte for current task |
| move.b #LOCKVAL,RAMSTAT(a0) | ; mark ram as disabled |
| move.b #LOCKVAL,RAMLOCK | ; signal hardware to lock ram |
| rts | ; return from subroutine |

The LOCK subroutine includes four instructions. The first instruction is executed to set up the pointer to the RAM status data in the task control block. The CPU 10 then executes the second instruction to move a predetermined constant "#LOCKVAL" ("57") into the RAM status data in the task control block to signify that the RAM 14 is in the locked status. The CPU 10 then executes the third instruction to transmit the constant "#LOCKVAL" ("57") to the RAMLOCK address (38000 hex). Because this data is other than "55" it will cause the comparator 18 to set the "Q" output of flip-flop 19 to a logic high and disable the EN1 input and CE output on the decoding circuit 15. As explained above this will prevent access to the RAM 14. The CPU 10 then executes a return instruction to return to the task being executed prior to the subroutine call.

Figure 2:
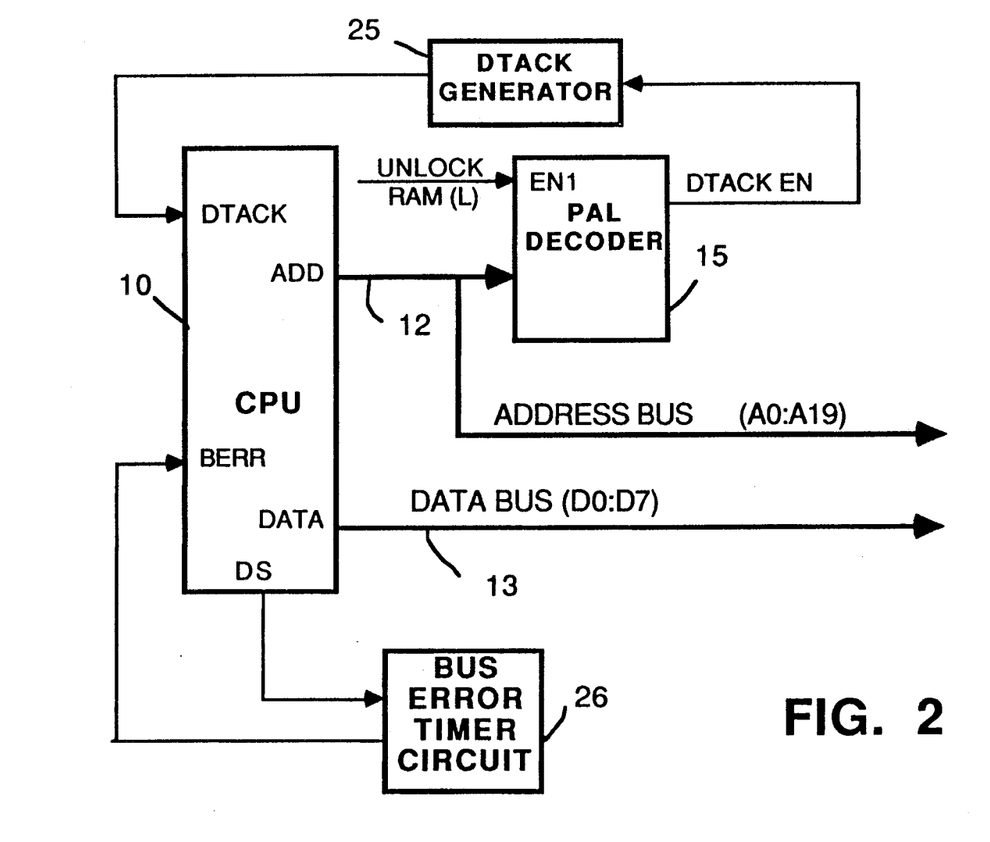
FIG. 2 is a block diagram of additional subcircuits in the microprocessor-controlled circuit for practicing the method of invention.

FIG. 2 shows a further aspect of the present invention. If the CPU 10 attempts to write to a limited access portion of the RAM 14, when it is locked, a bus error will be generated. This bus error cycle is initiated when a write operation is attempted to an address in the limited access range and an address is received at the PAL decoder 15 with the EN1 input disabled by the UNLOCK RAM (L) signal.

The PAL decoder 15 has one output connected through a DTACK EN line to a DTACK generator circuit 25. The DTACK generator circuit 25 transmits a DTACK (data acknowledge) signal to a DTACK input on the CPU 10 to end each bus cycle provided that the DTACK generator circuit 25 is enabled by the DTACK enable signal.

At the beginning of each bus cycle, the CPU 10 generates a data strobe (DS) signal, mentioned earlier, to a bus error timer circuit 26. This circuit 26 includes an LS123 retriggerable multivibrator (not shown) and a HCT74 flip-flop (not shown) to latch the output of the multivibrator. This is typical timing circuit known in the art.

The receipt of the DTACK signal by the CPU 10 will end the current bus cycle and a data strobe (DS) signal will be de-asserted at the bus error timer 26 to reset it before it times out. If the DTACK signal is not received, due to the lack of a DTACK EN signal, the bus error timer 26 will time out and generate a signal to the bus error (BERR) input on the CPU 10. This will cause the CPU 10 to jump to an error interrupt routine in its operating system program to process the error.

This has been a detailed description of a preferred embodiment of the invention. The invention can also be practiced with certain modifications of a type that are understood by those of ordinary skill in the art. Therefore, to apprise the public of the scope of embodiments contemplated by the invention, the following claims are made.

We claim:

1. A method of limiting access to a memory by a processor, the method comprising:

before performing an application program operation, executing an UNLOCK routine of processor instructions to allow writing of data to a limited access portion of the memory;

wherein execution of the UNLOCK routine includes the steps of:

(a) generating a selected address to activate a comparator to perform data comparison, and (b) generating predetermined data to the comparator for matching against a predetermined value to activate decoding circuitry;

during an application program operation, executing at least one instruction to address the decoding circuitry within a selected range of addresses to generate a circuit control signal to the memory, the circuit control signal allowing writing of data to the limited access portion of memory; and after the application program operation, executing a LOCK routine of processor instructions to prevent writing of data to the limited access portion of the memory;

wherein execution of the LOCK routine includes the steps of:

(c) generating the selected address to activate the comparator a second time, and (d) generating data to the comparator that does not match the preset value so as to disable the decoding circuitry and prevent further writing of data to the limited access portion of memory without further execution of the UNLOCK routine of processor instructions.

2. The method of claim 1, wherein execution of the UNLOCK routine further comprises the steps of:

(e) checking a memory status word to determine if the limited access portion of the memory is already unlocked for writing of data, (f) if the memory status word defines an unlocked status, performing steps (a) and (b) to confirm the status of the limited access portion of the memory;

(g) if the memory status word defines a locked status, changing the memory status word to define an unlocked status, and then performing steps (a) and (b) to permit writing of data to the limited access portion of the memory; and wherein execution of the LOCK subroutine further comprises the steps of:

(h) changing the memory status word to define a locked status, and (i) performing steps (c) and (d) to prevent further writing of data to the limited access portion of memory.

3. The method of claim 1, wherein the circuit control signal generated to the memory includes a write enable signal for writing data to the memory.

4. The method of claim 1, wherein the limited access portion of the memory is within a selected range of addresses and stores application program instructions.

5. The method of claim 1, wherein the memory is a random access memory.

6. A circuit for controlling access by a processor to a limited access portion of a memory having a selected range of addresses, the circuit comprising:

means for storing (1) an UNLOCK routine of processor instructions which is executed before executing an application program instruction stored in the memory and (ii) a LOCK routine of processor instructions which is executed after executing an application program instruction stored in the memory;

first decoding means responsive to a selected address for generating a comparison enable signal;

comparison means responsive to the comparison enable signal and responsive to predetermined data that matches a preset value to generate a memory addressing enable signal to the decoding means;

second decoding means responsive to the memory addressing enable signal and an address within the selected range to generate a memory circuit control signal that allows writing of data to the limited access portion of memory;

means for executing the UNLOCK routine of instructions, including means for generating the selected address to the first decoding means and for generating the predetermined data to the comparison means to activate the second decoding means; and means for executing the LOCK routine of processor instructions, including means for generating a second occurrence of the selected address to the first decoding means to produce a second occurrence of the comparison enable signal, said means also transmitting data other than the predetermined data to the comparison means to partially disable the second decoding means and prevent further writing of data to the limited access portion of memory without further execution of the UNLOCK routine of processor instructions.

7. The circuit of claim 6, wherein the limited access portion of memory stores application program instructions.

8. The circuit of claim 6, wherein the comparison means is a comparator circuit for comparing the predetermined data from the means for executing the LOCK routine and wherein the preset value is received at inputs connected to receive logic signals equivalent to the preset value.

9. The circuit of claim 6, wherein the comparison means includes means for latching the memory addressing enable signal in response to the comparison means receiving the predetermined data that matches the preset value, wherein the means for latching unlatches the memory addressing enable signal in response to the comparison means receiving data that does not match the preset value.

10. A method of limiting access to a memory by a processor during execution of an application program, the method comprising:

in preparation for performing an application program operation, executing a first processor instruction with a predetermined address and predetermined data to activate decoding circuitry which controls writing of data to a limited access portion of the memory;

executing at least one processor instruction to carry out the application program operation, including a processor instruction for generating addresses and control signals to the decoding circuitry to write data to the limited access portion of memory; and after the application program operation, executing a further processor instruction with predetermined address and predetermined data to disable the decoding circuitry and prevent writing of data to the limited access portion of the memory.

* * * * *

UNITED STATES PATENT AND TRADEMARK OFFICE
CERTIFICATE OF CORRECTION

PATENT NO. : 5,027,317

DATED : June 25, 1991

INVENTOR(S) : G. S. Pepera, et al.

It is certified that error appears in the above-identified patent and that said Letters Patent is hereby corrected as shown below:

Col. 5, line 58    "EN1" should be --EN1--.

Col. 6, line 6     Delete "." after --to--.

Col. 6, line 28    "EN1" should be --EN1--.

Col. 7, line 38    "get_event0" should be --get_event()--.

Col. 8, line 45    "#ID.ERR" should be --#ID_ERR--.

Col. 8, line 52    "was.unlocked" should be --was_unlocked--.

Col. 8, line 56    "was unlocked" should be --was_unlocked--.

Col. 8, line 66    "was unlocked" should be --was_unlocked--.

Col. 9, line 2     "AT.BREAKPOINT" should be --AT_BREAKPOINT--.

Col. 9, line 6     "execute.app.prog.statement" should be --execute_app_prog_statement()--.

UNITED STATES PATENT AND TRADEMARK OFFICE
CERTIFICATE OF CORRECTION

PATENT NO. : 5,027,317

DATED : June 25, 1991

INVENTOR(S) : G. S. Pepera, et al.

It is certified that error appears in the above-identified patent and that said Letters Patent is hereby corrected as shown below:

Col. 11, line 9    "(1)" should be --(i)--.

Signed and Sealed this

Sixth Day of October, 1992

Attest:

DOUGLAS B. COMER

*Attesting Officer*      *Acting Commissioner of Patents and Trademarks*